United States Patent
Dudar et al.

(10) Patent No.: US 9,850,853 B2
(45) Date of Patent: Dec. 26, 2017

(54) ESTIMATING VEHICLE FUEL REID VAPOR PRESSURE

(71) Applicant: Ford Global Technologies, LLC, Dearborn, MI (US)

(72) Inventors: Aed M. Dudar, Canton, MI (US); Robert Roy Jentz, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 79 days.

(21) Appl. No.: 13/853,680

(22) Filed: Mar. 29, 2013

(65) Prior Publication Data

US 2014/0297071 A1 Oct. 2, 2014

(51) Int. Cl.
| | | |
|---|---|---|
| B60L 9/00 | (2006.01) | |
| B60L 11/00 | (2006.01) | |
| G05D 1/00 | (2006.01) | |
| G05D 3/00 | (2006.01) | |
| G06F 7/00 | (2006.01) | |
| G06F 17/00 | (2006.01) | |
| F02M 25/08 | (2006.01) | |
| F02D 41/22 | (2006.01) | |
| F02D 41/00 | (2006.01) | |
| F02D 19/08 | (2006.01) | |
| F02D 41/04 | (2006.01) | |

(52) U.S. Cl.
CPC ....... F02M 25/0809 (2013.01); F02D 19/085 (2013.01); F02D 41/0025 (2013.01); F02D 41/22 (2013.01); *F02D 19/084* (2013.01); *F02D 41/042* (2013.01); *F02D 2041/225* (2013.01); *F02D 2200/0606* (2013.01); *F02D 2200/0612* (2013.01); *F02D 2200/703* (2013.01); *Y02T 10/36* (2013.01); *Y10S 903/93* (2013.01)

(58) Field of Classification Search
CPC ..................................................... G01M 3/025
USPC ............................................................ 701/22
See application file for complete search history.

(56) References Cited

U.S. PATENT DOCUMENTS

| | | | | |
|---|---|---|---|---|
| 5,146,902 | A * | 9/1992 | Cook | F02M 25/0818 123/198 D |
| 5,263,462 | A * | 11/1993 | Reddy | F02B 77/088 123/198 D |
| 5,297,529 | A * | 3/1994 | Cook | F02M 25/0818 123/198 D |
| 5,396,873 | A * | 3/1995 | Yamanaka | F02M 25/0809 123/520 |
| 5,411,004 | A * | 5/1995 | Busato | F02M 25/0818 123/198 D |
| 5,419,299 | A * | 5/1995 | Fukasawa | F02M 25/0809 123/520 |
| 5,427,075 | A * | 6/1995 | Yamanaka | F02M 25/0809 123/198 D |
| 5,437,257 | A * | 8/1995 | Giacomazzi | F02M 25/0809 123/198 D |

(Continued)

*Primary Examiner* — Jean-Paul Cass
(74) *Attorney, Agent, or Firm* — James Dottavio; McCoy Russell LLP

(57) ABSTRACT

Methods and systems are provided for estimating fuel volatility. During a vehicle-off condition following a refueling event, fuel volatility may be estimated by operating a fuel pump of a fuel system immediately after the refueling event while a fuel tank temperature is stable. Based on estimated fuel volatility, fuel injection amount and leak test thresholds may be adjusted.

13 Claims, 9 Drawing Sheets

(56) References Cited

U.S. PATENT DOCUMENTS

| | | | | |
|---|---|---|---|---|
| 5,845,627 | A * | 12/1998 | Olin | F02D 41/1401 123/676 |
| 5,878,727 | A * | 3/1999 | Huls | F02D 41/28 123/520 |
| 5,884,610 | A * | 3/1999 | Reddy | F02D 41/0045 123/520 |
| 6,079,396 | A * | 6/2000 | Ament | F02D 41/047 123/491 |
| 6,176,222 | B1 * | 1/2001 | Kirwan | F02D 35/023 123/492 |
| 6,178,949 | B1 * | 1/2001 | Kirwan | F02D 35/023 123/406.22 |
| 6,196,203 | B1 * | 3/2001 | Grieve | F02M 25/08 123/198 D |
| 6,314,797 | B1 * | 11/2001 | Dawson | F02M 25/0809 73/49.2 |
| 6,327,901 | B1 * | 12/2001 | Dawson | F02M 25/0809 73/114.39 |
| 6,360,726 | B1 * | 3/2002 | Javaherian | F02D 41/0025 123/435 |
| 6,374,847 | B1 * | 4/2002 | Dawson | F02M 25/0809 123/520 |
| 6,405,718 | B1 * | 6/2002 | Yoshioka | F02M 25/0809 123/198 D |
| 6,854,321 | B2 * | 2/2005 | Amlin | G01M 3/025 702/51 |
| 6,880,392 | B2 * | 4/2005 | Lee | F02D 19/0628 73/114.38 |
| 6,935,311 | B2 * | 8/2005 | Visser | F02P 5/1502 123/406.47 |
| 6,994,075 | B2 * | 2/2006 | Penschuck | F02M 25/08 123/518 |
| 7,059,313 | B2 * | 6/2006 | Lippa | F02P 5/1502 123/518 |
| 7,128,057 | B2 * | 10/2006 | Wiese | F02D 41/0025 123/494 |
| 7,210,455 | B2 * | 5/2007 | Visser | F02P 5/1502 123/1 A |
| 7,257,987 | B2 * | 8/2007 | O'Brien et al. | G01N 1/2202 73/23.22 |
| 7,272,485 | B2 * | 9/2007 | Amano | F02D 41/0045 701/104 |
| 7,565,900 | B2 * | 7/2009 | Sato | F02D 41/0045 123/1 A |
| 7,908,099 | B2 * | 3/2011 | Behar | F02M 25/0818 702/51 |
| 8,240,412 | B2 * | 8/2012 | Andri | B60L 11/123 123/478 |
| 8,479,849 | B2 * | 7/2013 | Leone | B60K 6/442 180/65.23 |
| 8,560,167 | B2 * | 10/2013 | Jentz | G01M 3/025 180/441 |
| 8,783,281 | B2 * | 7/2014 | Carter | F02M 21/0212 123/304 |
| 2001/0042399 | A1 * | 11/2001 | Dawson | F02M 25/0809 73/49.7 |
| 2003/0158635 | A1 * | 8/2003 | Pillar | A62C 27/00 701/1 |
| 2003/0158638 | A1 * | 8/2003 | Yakes | A62C 27/00 701/22 |
| 2003/0158640 | A1 * | 8/2003 | Pillar | A62C 27/00 701/29.4 |
| 2003/0213474 | A1 | 11/2003 | Lambert et al. | |
| 2003/0213475 | A1 * | 11/2003 | Robertson | F02D 19/0631 123/491 |
| 2004/0010349 | A1 * | 1/2004 | Perez et al. | 700/287 |
| 2004/0024502 | A1 * | 2/2004 | Squires | A62C 27/00 701/29.3 |
| 2004/0035183 | A1 * | 2/2004 | O'Brien | G01N 1/2202 73/23.27 |
| 2004/0069273 | A1 * | 4/2004 | Visser | F02P 5/1502 123/406.47 |
| 2004/0261506 | A1 * | 12/2004 | Amlin | G01M 3/025 73/49.7 |
| 2005/0133013 | A1 * | 6/2005 | Lippa | F02P 5/1502 123/685 |
| 2005/0247289 | A1 * | 11/2005 | Visser | F02P 5/1502 123/406.47 |
| 2007/0129878 | A1 * | 6/2007 | Pepper | B60W 40/12 701/123 |
| 2008/0215700 | A1 * | 9/2008 | Pillar | A62C 27/00 709/212 |
| 2009/0025458 | A1 * | 1/2009 | Ardash | F02D 41/221 73/49.7 |
| 2009/0114288 | A1 | 5/2009 | Grant et al. | |
| 2009/0277427 | A1 * | 11/2009 | Yoshimura | F02D 41/0032 123/520 |
| 2010/0313849 | A1 * | 12/2010 | Stoner et al. | 123/350 |
| 2010/0332108 | A1 | 12/2010 | Kato et al. | |
| 2011/0048374 | A1 * | 3/2011 | McAlister | 123/436 |
| 2011/0132306 | A1 * | 6/2011 | Kerns | F02B 43/12 123/1 A |
| 2011/0277577 | A1 * | 11/2011 | Roberge et al. | 74/473.1 |
| 2013/0030616 | A1 * | 1/2013 | Syed | F02D 41/0025 701/22 |
| 2013/0318946 | A1 * | 12/2013 | Morris | C10L 1/003 60/273 |
| 2014/0058596 | A1 * | 2/2014 | Martin | B60W 50/0205 701/22 |
| 2014/0074385 | A1 * | 3/2014 | Dudar | F02M 25/0818 701/113 |
| 2014/0107906 | A1 * | 4/2014 | Jentz | F02M 37/0088 701/102 |
| 2014/0187826 | A1 * | 7/2014 | Worden | C12M 23/34 568/840 |
| 2014/0297071 | A1 * | 10/2014 | Dudar | F02D 41/22 701/22 |
| 2014/0330482 | A1 * | 11/2014 | Yang | G07C 5/00 701/34.4 |
| 2015/0345435 | A1 * | 12/2015 | Yang | F02M 25/0809 123/520 |
| 2015/0345436 | A1 * | 12/2015 | Yang | F02M 25/0854 123/519 |
| 2015/0354480 | A1 * | 12/2015 | Dudar | F02D 41/0032 701/22 |
| 2016/0025589 | A1 * | 1/2016 | Tseng | F02M 25/0809 73/40.5 R |
| 2016/0153384 | A1 * | 6/2016 | Ulrey | F02D 41/3082 123/464 |
| 2016/0341156 | A1 * | 11/2016 | Yang | F02M 25/0854 |
| 2016/0348614 | A1 * | 12/2016 | Dudar | F02M 25/0809 |

* cited by examiner

← 700

| Actual Fuel RVP | Temperature (deg F) | Peak Pressure (In H2O) |
|---|---|---|
| 7 | 40 | 0.5 |
| 9 | 40 | 0.75 |
| 11 | 40 | 1 |
| 7 | 50 | 0.75 |
| 9 | 50 | 1.00 |
| 11 | 50 | 1.25 |
| 7 | 60 | 1 |
| 9 | 60 | 1.25 |
| 11 | 60 | 1.5 |
| 7 | 70 | 1.25 |
| 9 | 70 | 1.5 |
| 11 | 70 | 1.75 |
| 7 | 80 | 2 |
| 9 | 80 | 2.25 |
| 11 | 80 | 2.5 |
| 7 | 90 | 3 |
| 9 | 90 | 3.5 |
| 11 | 90 | 4 |
| 7 | 100 | 5 |
| 9 | 100 | 6 |
| 11 | 100 | 7 |

FIG. 7

ESTIMATING VEHICLE FUEL REID VAPOR PRESSURE

FIELD

The present disclosure relates to fuel volatility determination based on fuel Reid Vapor Pressure estimates in vehicles, such as hybrid vehicles.

BACKGROUND AND SUMMARY

Federal emissions regulations mandate the reformulation of fuels, such as gasoline fuel, sold at pumps to reduce the content of toxic and ozone-forming compounds in vehicle emissions. For example, to reduce the emission of volatile organic compounds (VOC), fuels sold in southern areas (e.g., areas categorized under ASTM class B) may be required to have a lower Reid vapor pressure (RVP) as compared to fuels sold in northern areas (e.g., areas categorized under ASTM class C) during summer months. Specifically, the differences in climate between the two types of areas may require a corresponding difference in the gasoline fuel volatility to achieve the same emissions effect. Therefore, depending on the seasonal temperatures and geographic locations, commercial fuel distributors may vary the composition of a given fuel. As a result, based on when and where a fuel tank (FT) was refilled with a given fuel, the fuel volatility and the RVP of the fuel may differ.

Fuel volatility has a direct consequence on the efficiency of an internal combustion engine (ICE). For example, combustion air-fuel ratio, which is a factor in determining fuel injection to an engine cylinder, is affected by fuel volatility. On-board diagnostic monitors of an engine control also apply fuel volatility estimates, for example in the monitoring and detection of fuel system leaks. One example approach for fuel volatility detection is shown by Grant et al. in US 2009/0114288 A1. Therein, based on the ideal gas law, and further based on fuel tank pressure and temperature sensor measurements, a controller determines the volatility of a fuel filled into the fuel tank. In other approaches, fuel volatility may be inferred from a fuel alcohol content, as estimated based on the output of an exhaust gas oxygen sensor. Still other approaches may use engine speed and torque data to infer fuel volatility.

However, the inventors herein have identified potential issues with such approaches. As one example, some of the above approaches rely on engine operation and cylinder combustion to be able to detect and estimate fuel volatility. In hybrid vehicles, where combustion may not occur for extended periods of time, an accurate and current fuel volatility estimate may not be available when needed. As another example, approaches relying on fuel tank pressure and temperature data may generate incorrect results due to fuel tank temperature acting as a control factor, as well as a noise factor. For example, depending on how long a vehicle engine was on before the temperature and pressure data was collected may affect how much heat was rejected from the running engine to the fuel tank. Likewise, a temperature of the parking surface where the vehicle is parked, as well as wind and sun loading on the fuel system, may cause the fuel tank temperature and pressures to fluctuate, resulting in variations in fuel volatility estimates. Incorrect fuel volatility estimates may in turn corrupt leak test results. For example, a fuel that is actually more volatile than estimated may offset a true leak and trigger a false positive in an engine-off natural vacuum (EONV) leak test. As another example, a fuel that is actually more volatile than estimated may overwhelm a vacuum pump and trigger a false negative when used in a vacuum pump assisted leak test. In either case, the false result can lead to a leak not being correctly identified and degraded exhaust emissions.

In one example, the above issues may be addressed, at least in part, by a method for accurately estimating fuel volatility in a hybrid vehicle system. One example method for an engine, comprises: adjusting a leak test based on a fuel volatility, the fuel volatility estimated during a vehicle-off condition after a refueling event. In this way, fuel volatility determination can be performed in hybrid vehicles during a vehicle-off condition without dependence on engine activity.

For example, during a vehicle-off condition following a refueling event, the controller (e.g., a powertrain control module or PCM) of a hybrid vehicle system may be woken up after a long duration in sleep mode (e.g., in hours). The duration may be long enough to allow the temperature and pressure in the fuel tank to stabilize. Upon waking up, the controller may monitor changes in fuel tank pressure and temperature over a short duration of time (e.g., in minutes or seconds). If changes in fuel tank pressure and temperature are not greater than a threshold change (that is, fuel tank conditions remain stable), fuel volatility estimation conditions may be considered met. Accordingly, the fuel tank may be sealed and a fuel pump may be activated (without operating the engine) to agitate fuel in the tank, leading to an increase in fuel tank pressure. A peak pressure achieved at the given fuel temperature may be used to estimate fuel RVP. For example, the estimated peak pressure value may be compared to predetermined data for known fuel RVPs stored in a look-up table of the controller and used to update a fuel volatility estimate of refilled fuel.

The fuel volatility estimate can then be utilized to adjust engine operating parameters, such as a leak test threshold for evaporative emission leak detection tests. For example, when leak test conditions are met, a positive or negative pressure may be applied to the isolated fuel tank until a threshold pressure level is reached. Then, a rate of change of pressure (to barometric pressure) may be monitored. A fuel system leak may be indicated if the rate of change of pressure is greater than the leak test threshold (wherein the threshold was based on the estimated fuel volatility).

In this way, fuel volatility may be estimated in a hybrid vehicle having limited engine run times. By estimating fuel volatility during selected vehicle-off conditions by operating a fuel pump, fuel volatility may be determined without relying on engine combustion. By adjusting engine operating parameters, such as a leak test threshold, based on an updated fuel volatility estimate, more robust and accurate leak diagnostic results are achieved. By improving the accuracy of leak detection, exhaust emissions may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

The subject matter of the present disclosure will be better understood from reading the following detailed description of non-limiting embodiments, with reference to the attached drawings.

FIG. 7 shows an example PCM look-up table.

DETAILED DESCRIPTION

Figure 8:
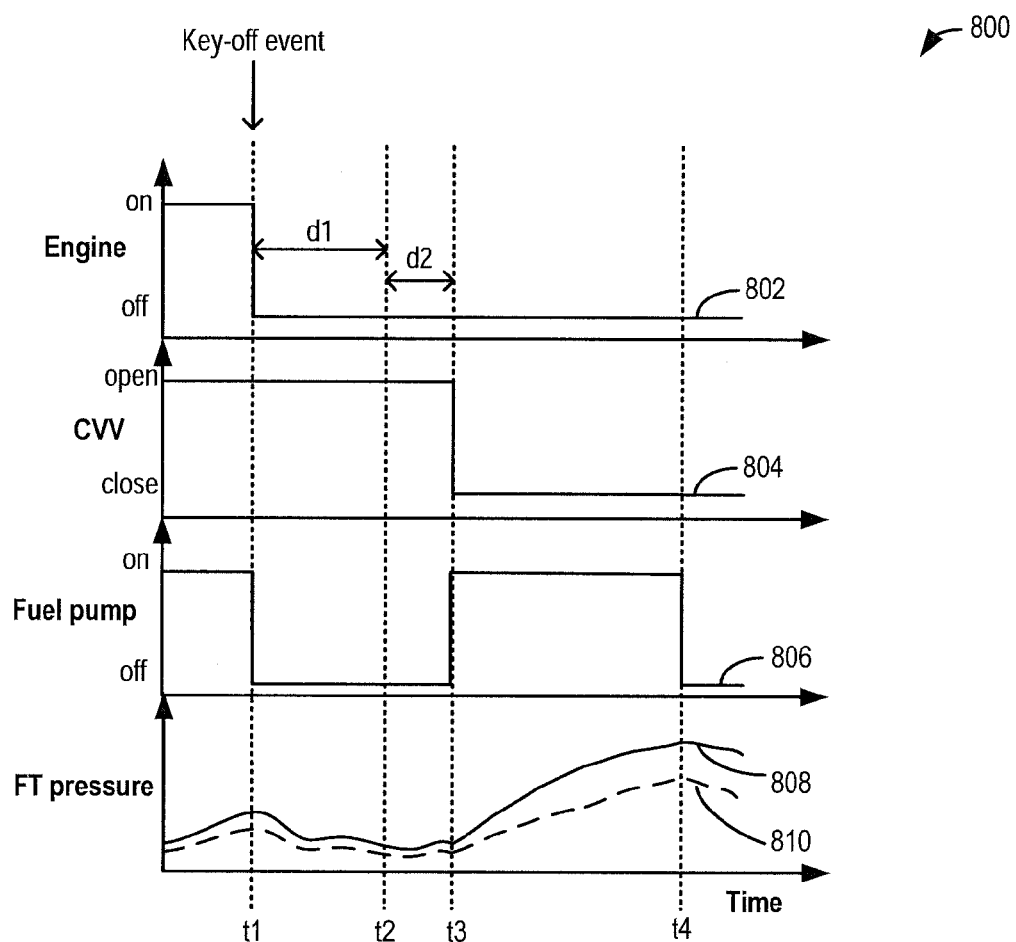
FIG. 8 shows an example fuel tank peak pressure estimation.

Methods and systems are provided for estimating fuel volatility in a fuel system (such as fuel system of FIG. 1) coupled to an engine in a hybrid vehicle. Fuel volatility may be estimated during selected vehicle-off conditions when fuel tank temperatures and pressures have stabilized after a refueling event. A controller may be configured to perform a control routine such as the example routine of FIG. 2, during selected vehicle-off conditions after a refueling event where fuel tank temperature and pressure have stabilized, to estimate fuel volatility. The controller may then estimate and update fuel volatility based on fuel tank peak pressure estimates, as elaborated at FIGS. 3 and 5-7. The updated fuel volatility estimate may be used to adjust various engine operating parameters, such as a leak test threshold (FIG. 4). An example fuel volatility estimation is shown at FIG. 8. Example leak tests are described at FIG. 9.

Figure 1:
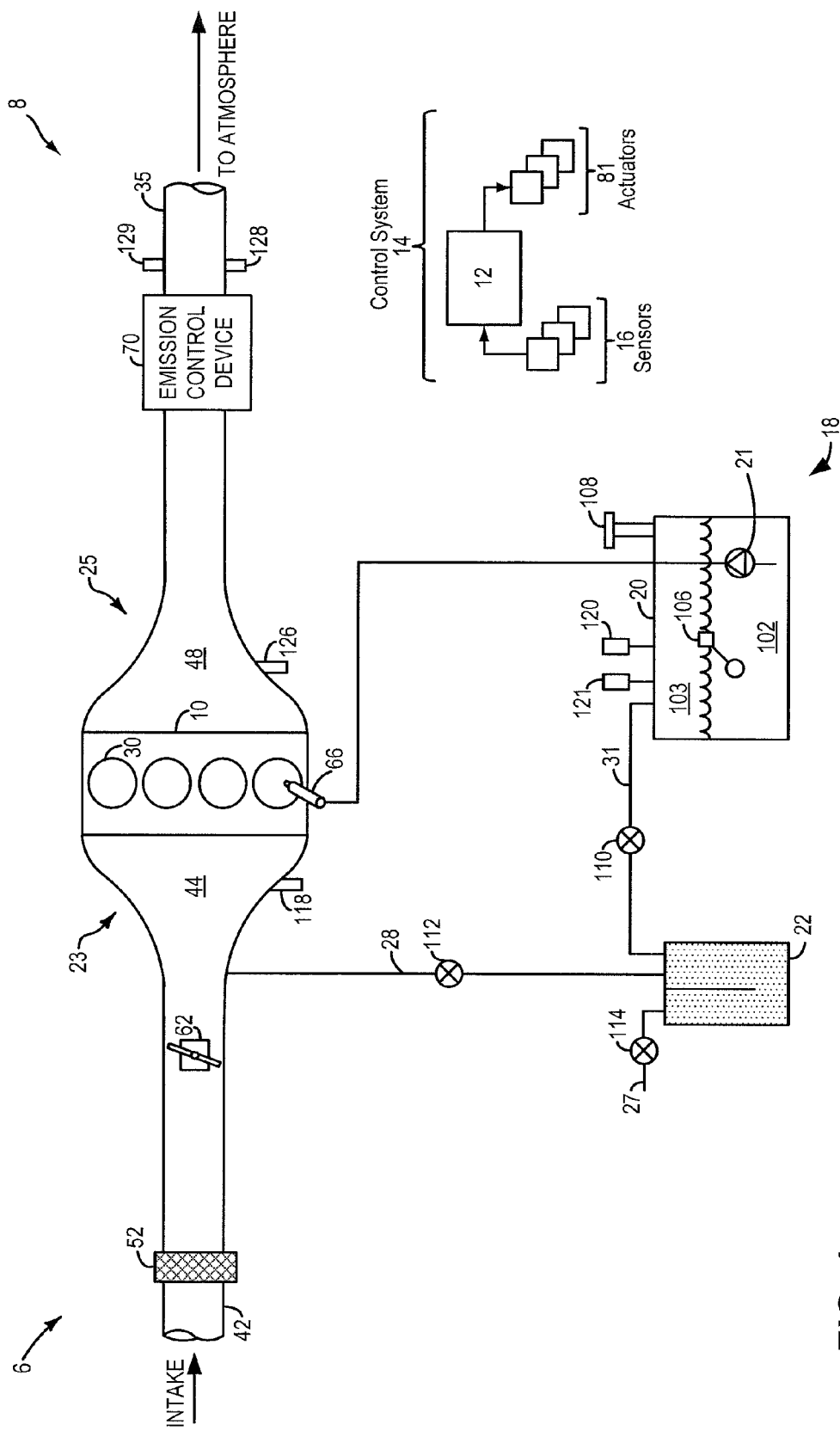
FIG. 1 shows a schematic representation of a fuel system coupled to an engine system in a hybrid vehicle.

FIG. 1 shows a schematic depiction of a hybrid vehicle system 6 that can drive propulsion power from engine system 8 and/or an on-board energy storage device, such as a battery system (not shown). An energy conversion device such as a generator (not shown), may be operated to absorb energy from vehicle motion and/or engine operation, and then convert the absorbed energy to an energy form suitable for storage by the energy storage device. The hybrid vehicle system 6 may include one or more electric motors (not shown) that convert energy from the energy storage device into mechanical energy.

Engine system 8 may include an engine 10 having plurality of cylinders 30. Engine 10 includes an engine intake 23 and an engine exhaust 25. Engine intake 23 includes an engine intake throttle 62 fluidly coupled to the engine intake manifold via an intake passage 42. Air may enter intake passage 42 via air filter 52. Engine exhaust 25 includes exhaust manifold 48 leading to an exhaust passage 35 that routes exhaust air to the atmosphere. Engine exhaust 25 may include one or more emission control devices 70 mounted in a closed-couple position. The one or more emission control devices may include a three-way catalyst, lean NOx trap, diesel particulate filter, oxidation catalyst, etc. It will be appreciated that other components may be included in the engine, such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and fuel vapor canister 22. During a fuel tank refueling event, fuel may be pumped into the vehicle from an external source through a refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in the fuel tank 20 may provide an indication of the fuel level ("Fuel Level Input") to the controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector is shown, additional injectors are provided for each cylinder. It will be appreciated that the fuel system 18 may be a return-less fuel system, a return fuel system, or various other types of fuel system. Vapors generated in fuel tank 20 may be routed to fuel vapor canister 22, via conduit 31, before being purged into the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister is shown, it may be appreciated that fuel system 18 may include any number of canisters.

Canister 22 includes a vent 27 for routing gases out of the canister 22 to the atmosphere when storing, or trapping fuel vapors from fuel tank 20. Vent 27 may also allow fresh air to be drawn into fuel vapor canister when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and atmosphere. The canister vent valve may also be used when estimating fuel volatility and for diagnostic routines. When included, the vent valve may be opened during fuel vapor storing conditions (for example, during fuel tank refueling and while engine is no running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicles emission control system. To address this, a fuel tank isolation valve 110 may be included in conduit 31 such that fuel tank 20 is coupled to canister 22 via the valve. During regular engine operation, isolation valve 110 may be kept closed to limit the amount of diurnal vapors directed to canister 22 from fuel tank 20. During refueling operations and selected purging conditions, isolation valve may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors may be coupled to fuel system for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between fuel tank and canister 22, specifically between the fuel tank 20 and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of pressure difference across the valve. As elaborated herein at FIGS. 2-4, a vehicle control system may estimate and update the volatility of a fuel recently filled in the fuel tank based on changes in a fuel tank pressure.

One or more temperature sensors may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating fuel tank temperature. While the depicted example shows temperature sensor 121 directly coupled to fuel tank 20, in alternate embodiments, the temperature sensor may be coupled between the fuel tank and canister 22. As elaborated herein at FIGS. 2-4, a vehicle control system may determine whether initiate a fuel volatility estimation routine based on fluctuations in a fuel tank temperature.

Fuel vapors released from canister 22, for example during a purging operation, may be directed into engine intake manifold 44 via purge line 28. The flow of vapors along purge line 28 may be regulated by canister purge valve 112, coupled between fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be required if the canister purge valve control is not accurately timed or the canister purge valve itself can be forced opened by a high intake manifold pressure. An estimate of the manifold absolute pressure (MAP) or manifold vacuum (Man Vac) may be obtained from MAP sensor 118 coupled to intake manifold 44 and communicated with controller 12. Alternatively, MAP may be inferred from alternate engine operating conditions, such as mass air flow (MAF), as measured by a MAF sensor coupled to the intake manifold.

Fuel system 18 may be operated by controller 12 in a plurality of modes by selective adjustment of various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve 112 to direct refueling vapors into canister 22 while preventing fuel vapors from being directed to the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve 114 while closing isolation valve 110. Herein, the vacuum generated by the intake manifold of the operating engine may be used to draw fresh air through vent 27 and through fuel vapor canister 22 to purge stored fuel vapors into intake manifold. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is amount of fuel vapors stored in the canister). Based on the canister load, and further based on engine operating conditions, such as engine speed-load conditions, a purge flow rate may be determined.

During selected vehicle-off conditions, such as following a refueling event, controller 12 may be configured to perform a fuel volatility estimation routine. By performing the fuel volatility estimation while the vehicle is in a vehicle-off condition, fuel volatility can be estimated with reduced dependence on engine activity, facilitating fuel volatility estimation in hybrid vehicles where an engine may not be operated for extended periods of time. As such, the fuel volatility may be estimated based on a fuel blend's Reid Vapor Pressure (RVP). Controller 12 may store peak pressure characteristics of known RVP fuels determined at different temperatures in a PCM look-up table (as shown at FIG. 7), which may be used to estimate RVP of a fuel blend after a refueling event. To estimate fuel RVP, a peak pressure may be determined in the fuel tank 20 at a given temperature. The measured peak pressure and temperature may be subsequently compared with peak pressures and temperatures stored in the look-up table to estimate and update the fuel RVP.

Since fuel RVP estimation is dependent on fuel tank temperature and pressure, it is sensitive to fluctuations in temperature (and consequently, pressure). In particular, variations in fuel tank temperature may occur due to, for example, temperature of a location where the vehicle is parked (e.g., covered or uncovered parking area), exhaust component locations, drive cycle of the vehicle (e.g., city or highway driving), heat rejection to the fuel tank from the engine, etc. Therefore, temperature may function as a control factor as well as a noise factor. To minimize the effect of temperature fluctuations, fuel RVP estimation may be performed by monitoring the fuel tank temperature following a refueling and vehicle-off event, and while a fuel tank temperature stays within a threshold range (that is, while the temperature remains stable), by isolating the fuel tank 20 and operating a fuel pump 21 to agitate the fuel and produce vapors. The resulting peak pressure at a given temperature may be subsequently compared to the look-up table to estimate fuel RVP. The estimated fuel RVP may be applied to adjust engine operating parameters such as fuel injection amount, and a leak detection test threshold.

By performing fuel volatility estimation during vehicle-off conditions, without dependence on engine combustion, fuel RVP can be estimated in hybrid vehicles where engine operation may be limited. By allowing the temperature to stabilize and then estimating the fuel RVP, noise contribution due to temperature fluctuations may be reduced and a more accurate fuel volatility estimate may be obtained.

Controller 12 may also be configured to intermittently perform leak detection routines on fuel system 18 to confirm that the fuel system is not degraded. Leak detection routines may be performed while the vehicle is in a vehicle-on condition, including an engine-on condition where the engine is the running to propel the vehicle. Alternatively, leak detection routines may be performed while the vehicle is in a vehicle-off condition, including an engine-off condition where the engine is not running to propel the vehicle. Leak tests may be performed by sealing the fuel system and applying a positive pressure on the fuel system for a duration (e.g., until a target fuel pressure is reached) and subsequently monitoring a change in fuel tank pressure (e.g., rate of pressure decay or pressure bleed-down or a final pressure value), or by sealing the fuel system and applying negative pressure on the fuel system for a duration (e.g., until a target fuel tank vacuum is reached) and subsequently monitoring a change in fuel tank pressure (e.g., rate of vacuum decay or pressure bleed-up, or a final pressure value).

Leak tests performed while the vehicle engine is on may include applying an engine intake vacuum (generated by the running engine) on the fuel system for a duration (e.g., until a target fuel tank vacuum is reached) and then sealing the fuel system to monitor a subsequent change in fuel tank pressure (e.g., a rate of change in the vacuum level, or a final pressure value). Specifically, the canister purge valve may be opened to apply the engine intake vacuum on the fuel tank, and then, once a threshold fuel tank vacuum is reached, the canister purge valve and the canister vent valve may be closed to isolate the fuel tank, and a rate of vacuum bleed-up the atmospheric pressure is monitored. If a rate of bleed-up is higher than a threshold, a leak may be indicated.

Leak tests performed while the vehicle engine is off may include applying an engine-off natural vacuum on the sealed fuel system for a duration (e.g., until a target fuel tank vacuum is reached) and then monitoring a subsequent change in fuel tank pressure (e.g., a rate of change in the vacuum level, or a final pressure value).

Leak tests performed during a vehicle-off event may also involve applying negative pressure to the fuel system by isolating the fuel system and subsequently engaging a vacuum pump (not shown). After a threshold fuel tank negative pressure has been reached, a fuel tank pressure bleed-up is monitored at pressure sensor 120. Based on the pressure bleed-up rate (or vacuum decay rate) and the final stabilized fuel tank pressure following the application of the negative pressure, the presence of a fuel system leak may be determined. A leak may be determined and fuel system degradation may be indicated in response to a pressure bleed-up rate (or vacuum decay rate) that is faster than a threshold rate.

Further, leak test during vehicle-off conditions may also be performed by applying positive pressure to the fuel system. During a positive pressure leak test, the fuel tank 20 may be sealed and a fuel pump 21 may be operated to agitate the fuel and produce vapors. This results in a rise in fuel tank pressure. After a threshold pressure is reached in the fuel tank 20, the fuel pump 21 may be turned off and a pressure bleed-down is monitored. Fuel system leaks are then identified based on the bleed-down rate, with the bleed-down being faster than a threshold rate in the presence of a leak.

During vehicle-off conditions, leak detection may be performed after a sufficient duration has elapsed since a vehicle-off event wherein the vehicle has been in a vehicle-off condition with no interim engine operation for the duration. In other words, leak detection may be performed after a vehicle engine has been turned off for a sufficient amount of time that allows a fuel tank temperature to stabilize to ambient conditions. In doing so, the noise contribution of temperature is reduced.

It will be appreciated that vehicle-off conditions may vary based on the configuration of the vehicle system. For example, embodiments of vehicle-off conditions may vary for hybrid-drive enabled vehicle systems, non-hybrid-drive enabled vehicle systems, and push-button engine start-enabled vehicle systems. It will be appreciated, however, that the vehicle-off conditions referred to herein are one-to-one equivalent to engine-off conditions.

As a first example, in vehicles configured with an active key, a vehicle-off condition may include a key-off condition. As such, in active key-based vehicle configurations, the active key is inserted into a keyhole to move the position of a keyhole slot between a first position corresponding to a vehicle-off condition, a second position corresponding to a vehicle-on condition, and a third position corresponding to a starter-on condition. To start cranking the vehicle engine, the key is inserted in the keyhole and the slot is moved from the first position to the third position via the second position. A vehicle-off event occurs when the active key is used to return the slot from the third position to the first position, followed by removal of the key from the slot. In response to the slot being returned to the first position and the active key being removed, an engine-off as well as a vehicle-off condition is indicated.

As a second example, in vehicles configured with start/stop button, a vehicle-off condition may include a stop button actuated condition. In such embodiments, the vehicle may include a key that is inserted into a slot, as well as an additional button that may be alternated between a start position and a stop position. To start cranking the engine, the vehicle key is inserted in the keyhole to move the slot to an "on" position and additionally the start/stop button is pushed (or actuated) to the start position to start operating the engine starter. Herein, a vehicle-off condition is indicated when the start/stop button is actuated to the stop position As a third example, in vehicles configured with a passive key, a vehicle-off condition may include the passive key being outside a threshold distance of the vehicle. The passive key may include an ID tag, such as an RFID tag, or a wireless communication device with a specified encrypted code. In such embodiments, in place of an engine keyhole, the passive key is used to indicate the presence of a vehicle operator in the vehicle. An additional start/stop button may be provided that can be alternated between a start position and a stop position to accordingly start or stop the vehicle engine. To start running the engine, the passive key must be present inside the vehicle, or within a threshold distance of the vehicle) and the button needs to be pushed (actuated) to a start position to start operating the engine starter. A vehicle-off (and also engine-off) condition is indicated by the presence of the passive key outside the vehicle, or outside a threshold distance of the vehicle.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, temperature sensor 121, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62. The control system 14 may include a controller 12. The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIGS. 2-4.

In this way, the system of FIG. 1 enables a method for estimating fuel volatility of a fuel in a hybrid vehicle during a vehicle-off condition after a refueling event, and enables a leak test to be adjusted based on fuel volatility.

Figure 2:
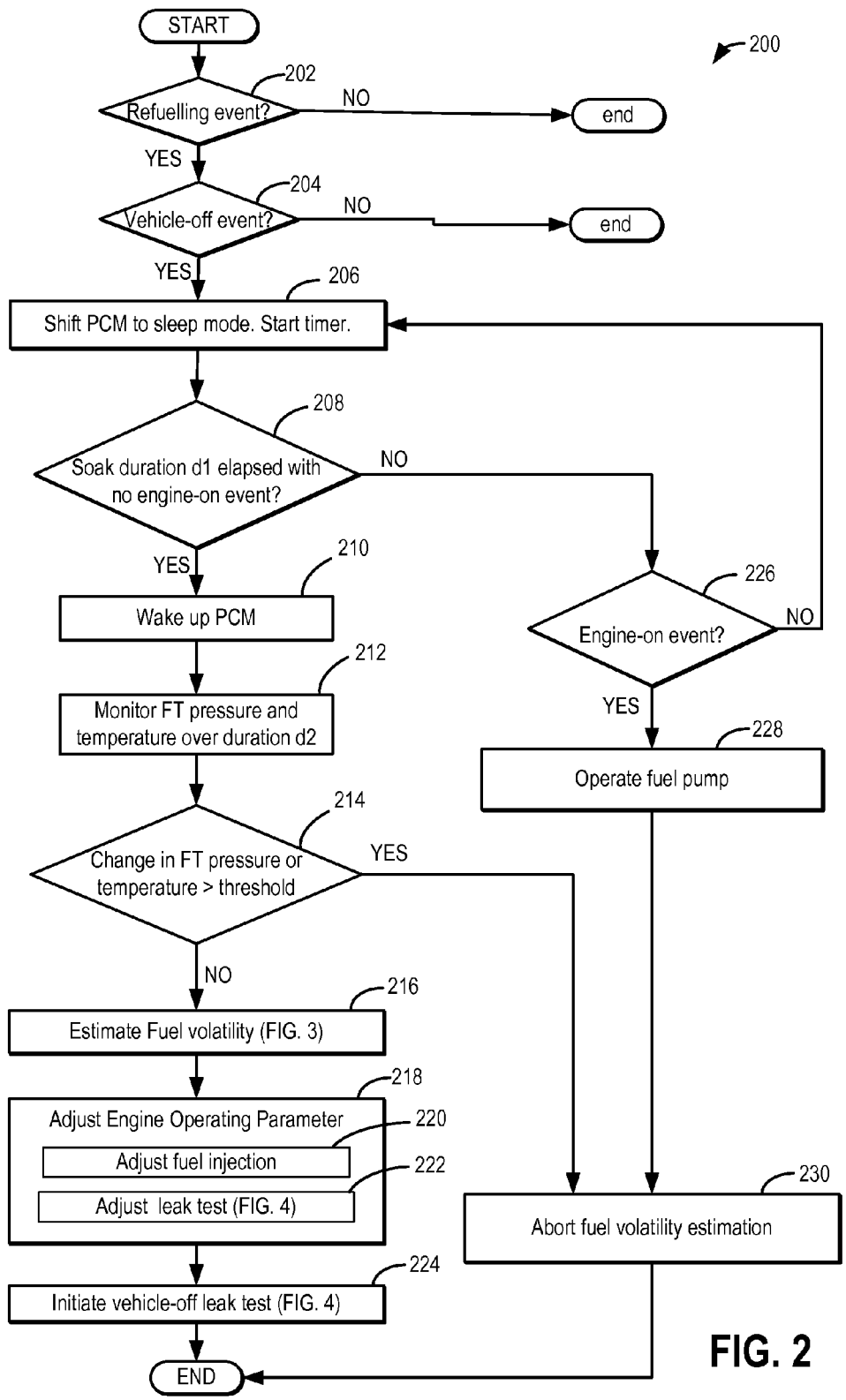
FIG. 2 shows a flow chart illustrating a routine for initiating a vehicle-off leak test based on estimated fuel volatility.

Now turning to FIG. 2, an example routine 200 is shown for identifying conditions to estimate fuel volatility and adjusting engine operating parameters based on determined fuel volatility.

At 202, the routine includes confirming a refueling event. During a refueling event, fuel may be added to the fuel tank through the refueling door. A refueling event may be confirmed in response to an increase in the level of fuel in the fuel tank detected by a fuel level sensor located in the fuel tank. At 204, the routine includes confirming a vehicle-off event. In particular, it may be confirmed that the vehicle-off event is a vehicle-off event that immediately follows the refueling event. A vehicle-off event may be confirmed in response to a key-off condition where the vehicle includes an active key, a stop button actuated condition where the vehicle includes an ignition start/stop button, and a passive key being outside a threshold distance of the vehicle where the vehicle includes a passive key. In response to the vehicle-off event, at 206, a controller of the vehicle system (such as a vehicle powertrain control module or PCM) may be shifted to a sleep mode to reduce vehicle-off energy consumption by on-board sensors, auxiliary components, and diagnostics. In addition, a timer may be started.

At 208, it may be determined if a soak duration d1 has elapsed since the vehicle-off event with no engine-on event. For example, routine 208 may involve determining whether a time duration d1 has passed on the timer that was started at 206. The duration d1 may be sufficiently long (such as a few hours) to allow stabilization of fuel tank temperature and pressure to ambient conditions. Temperature stabilization reduces the effect of temperature as noise during fuel volatility determination.

Further, at 208, it may be determined that during the duration d1, the vehicle has been in vehicle-off condition with no engine-on event. Herein, the engine-on event may be either an operator induced engine-on event or an automatic engine-on which includes events wherein the engine is turned on automatically, and without input from a vehicle operator. As an example, in vehicles configured with idle start/stop systems, the automatic engine-on event may include an automatic engine restart from idle-stop in response to engine operating parameters falling outside a threshold range. For example, the engine may be automatically started by the vehicle controller in response to a battery state of charge falling below a threshold or in response to an air pressure in a compressor falling below a threshold. Accordingly, if vehicle has not been in vehicle-off conditions during the duration d1, it may be determined if an engine-on event has occurred at 226. If yes, then at 228, in response to the engine-on event, a fuel pump may be operated to fuel the engine and, at 230, fuel volatility estimation may be aborted. Fuel volatility estimation may be reattempted during a subsequent vehicle-off condition.

Returning to 208, upon confirming that the duration d1 has elapsed, at 210, the PCM may be woken up. Specifically, at 210, the PCM controller may be shifted from a sleep mode to a wake-up mode.

Upon waking up the PCM, at 212, the routine includes monitoring fuel tank pressure and temperature for a monitoring duration d2. The monitoring duration d2 may be shorter (such as few minutes or seconds) than the soak duration d1. At 214, it may be determined if there was a change in fuel tank temperature and pressure over the duration d2. In particular, fuel tank temperature and pressure may be monitored for variations and fluctuations arising due to changes in ambient conditions (such as due to parking location of the vehicle, sun and wind loading on the fuel system, etc.). If the change is not greater than a threshold, it may be determined that conditions for fuel volatility estimation have been met. At 216, a routine may be executed to estimate fuel volatility. Fuel volatility estimation will be described in detail at FIG. 3. Therein, the fuel pump is activated without operating the engine to determine a peak pressure at a given temperature, based on which fuel volatility is estimated.

If the change in fuel tank pressure or temperature is greater than the threshold, then it may be determined that conditions for fuel volatility estimation have not been met and at 230, fuel volatility estimation may be aborted. In one example, the controller may be shifted to a snooze mode and the timer may be reset to zero, so that the controller can be woken up again after a threshold duration has elapsed. After waking up, the controller may resume monitoring of a fuel tank pressure and temperature and if the change is not greater than the threshold, a fuel volatility estimation routine may be re-initiated.

Upon estimating fuel volatility, the routine at 218 includes adjusting engine operating parameters based on the estimated fuel volatility. Adjusting engine operating parameters may include adjusting a fuel injection amount during a subsequent engine operation, and adjusting a leak test. For example, during an engine-on condition following the estimation of fuel volatility, a fuel injection amount may be adjusted based on estimated fuel volatility to maintain engine combustion at a desired air-fuel ratio. This involves adjusting the fuel injection amount such that the fuel injection amount is decreased as the fuel volatility increases.

Adjusting the leak test may include adjusting a leak test threshold to increase accuracy of leak monitoring and detection. For example, for fuels with higher volatility, the leak test threshold may be adjusted to a higher level, and for fuels with lower volatility, the leak test threshold may be set to a lower level. In other words, leak test thresholds may be increased as the estimated fuel volatility increases and leak test thresholds may be decreased as the estimated fuel volatility decreases.

Upon adjusting the engine operating parameters based on estimated fuel volatility, at 224, a routine may be executed to initiate a vehicle-off leak test. Initiating a vehicle-off leak test may involve, at first, determining if the conditions for a vehicle-off leak test have been met. In one example, if the vehicle is in a vehicle-off condition for a sufficiently long duration after the fuel volatility is estimated, leak test conditions may be considered met, and each of a fuel volatility estimation and a vehicle-off leak test may be performed during the same vehicle-off condition. However, if there is a vehicle-on condition following the fuel volatility estimation, a vehicle-on leak test with the adjusted threshold may be performed during the vehicle-on condition. Alternatively, a vehicle-off leak test may be initiated during a subsequent (second) vehicle-off condition where leak test conditions are met, with the adjusted threshold. In some examples, a vehicle-on leak test and a vehicle-off leak test may be performed to increase the strength of leak monitoring. Example leak tests are elaborated at FIGS. 4 and 9.

In this way, following a refueling event and during a vehicle-off condition, while a temperature stays within a threshold range, fuel volatility may be estimated. Based on the estimated fuel volatility, engine operating parameters such as fuel injection and on-board diagnostic monitoring systems (e.g., evaporative leak detection) may be adjusted.

Figure 3:
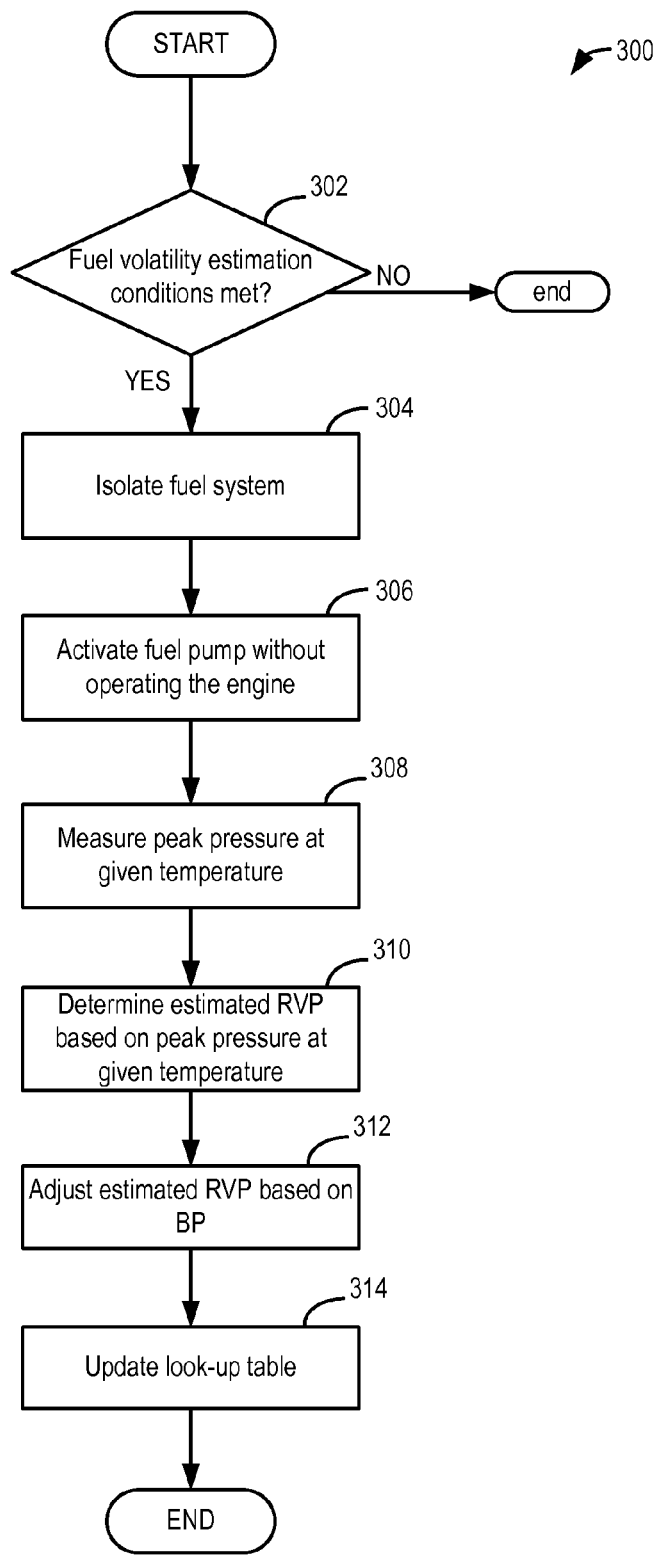
FIG. 3 shows a flow chart illustrating a routine for estimating fuel Reid Vapor Pressure.
Figure 4:
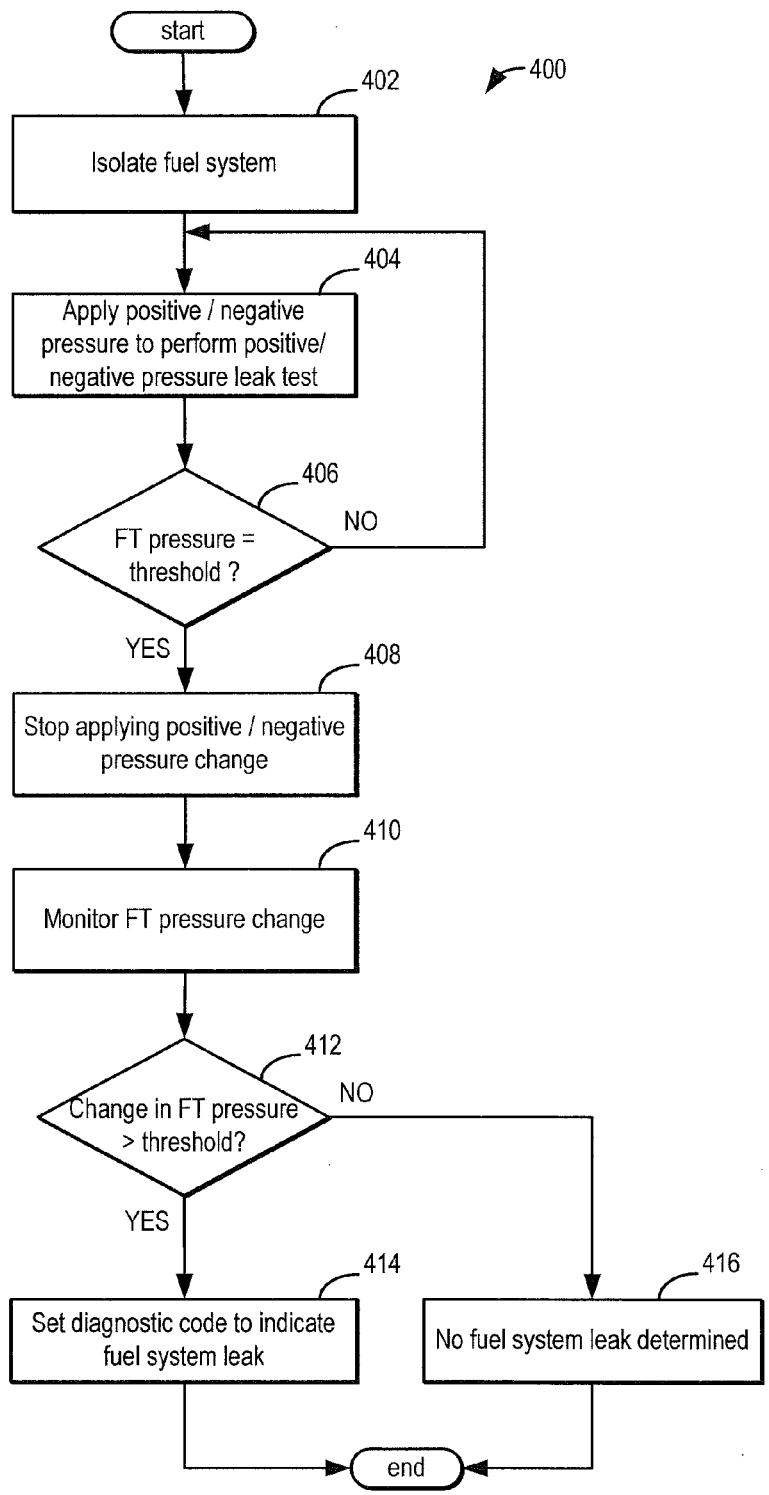
FIG. 4 shows a high level flow chart illustrating a routine that may be implemented for conducting a leak test.

Now turning to FIG. 3, routine 300 shows an example method for estimation of fuel RVP that may be performed while the fuel tank temperature stays within a threshold during a vehicle-off condition following a refueling event. Herein, fuel RVP is estimated based on peak pressure generated by vapors in the fuel tank. In one example, the routine of FIG. 3 may be performed as part of the routine of FIG. 2, such as at 216.

At 302, it may be determined if fuel volatility estimation conditions have been met. As elaborated in FIG. 2, this includes confirming that a refueling event has occurred, that a vehicle-off condition is met following the refueling event, that the vehicle has remained in the vehicle-off condition for a soak duration d1 (e.g., in hours) with no engine-on event, and that after the soak duration, when a fuel tank temperature and pressure is monitored for a shorter monitoring duration d2 (e.g., in seconds or minutes), the change in temperature or pressure is less than a threshold.

If fuel RVP estimation conditions are met, then at 304, the fuel system may be isolated or sealed. The fuel system may be isolated by closing a canister purge valve that couples a canister to the engine intake and by closing a canister vent valve that couples the canister to the atmosphere. Upon isolating the fuel system, at 306, the fuel pump may be operated for a duration to increase the fuel tank pressure, without operating the engine. In particular, the fuel pump is operated to raise fuel tank pressure and not to fuel the engine. In one example, operating the fuel pump may include operating the fuel pump at 100% duty cycle. However, in alternate examples, in order to save battery power and reduce NVH issues, the fuel pump may be operated, for example, at 50% duty cycle or less. The fuel in the fuel tank may be agitated to produce vapors by the operation of the fuel pump in the isolated fuel system. As a result, some of the liquid in the fuel tank may shift to vapor phase, causing a corresponding increase in fuel tank pressure. The duration of fuel pump operation may be based on the fill level of the fuel tank and the temperature of the fuel tank. The fuel tank temperature may be measured by a fuel tank temperature sensor. The fuel tank temperature may also be determined based on ambient temperature.

At 308, the routine includes measuring a peak pressure of the fuel tank at the given temperature. As such, for a given temperature, the peak pressure measured is the pressure of the fuel tank at which the vapor phase of the fuel is in equilibrium with the liquid phase. For example, fuel tank peak pressure is the pressure at which no more fuel vapors may be added to the fuel tank vapor space. In other words, when fuel tank peak pressure is reached, there may be no further increase in the fuel tank pressure. The peak pressure for a fuel blend in a fuel tank is dependent upon the temperature of the fuel tank. For example, the peak pressure for a fuel blend may be different when measured at different temperatures. The temperature of the fuel tank is also influenced by the ambient temperature conditions surrounding the vehicle. For example, depending on where the vehicle is parked, sun and wind loading conditions, the fuel tank temperature may be higher or lower and consequently, the peak pressure of a fuel may differ. The relationship between temperature, pressure and fuel RVP is further elaborated at FIGS. 5 and 6.

Figure 5:
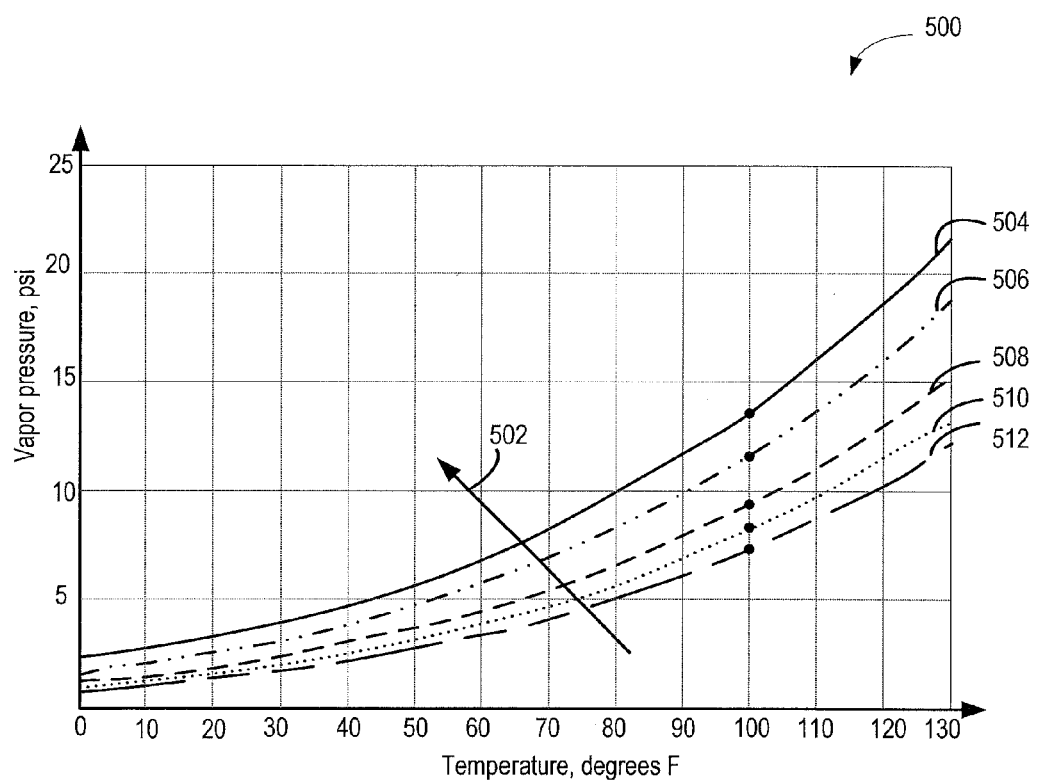
FIG. 5 shows a graph illustrating an example Reid Vapor Pressure calculation.

Turning to FIG. 5, an example graph 500 showing fuel Reid Vapor Pressure measurements for different RVP fuels (in a laboratory setting) is provided. The graph is plotted with temperature on the x-axis and fuel vapor pressure on the y-axis. In this example, a pressure curve for different fuels is plotted by heating a chilled fuel in a sealed container. As the temperature increases, the vapor pressure of the fuel increases. The temperature of the fuel is varied from 0° F. to 130° F. Reid Vapor Pressure is measured as the vapor pressure of the fuel at 100° F. Plots 504, 506, 508, 510 and 512 represent pressure curves of fuels with an RVP of 13, 11, 9, 7.8, and 7 respectively. As shown by arrow 502, with increasing fuel RVP, the vapor pressure at a given temperature increases.

Figure 6:
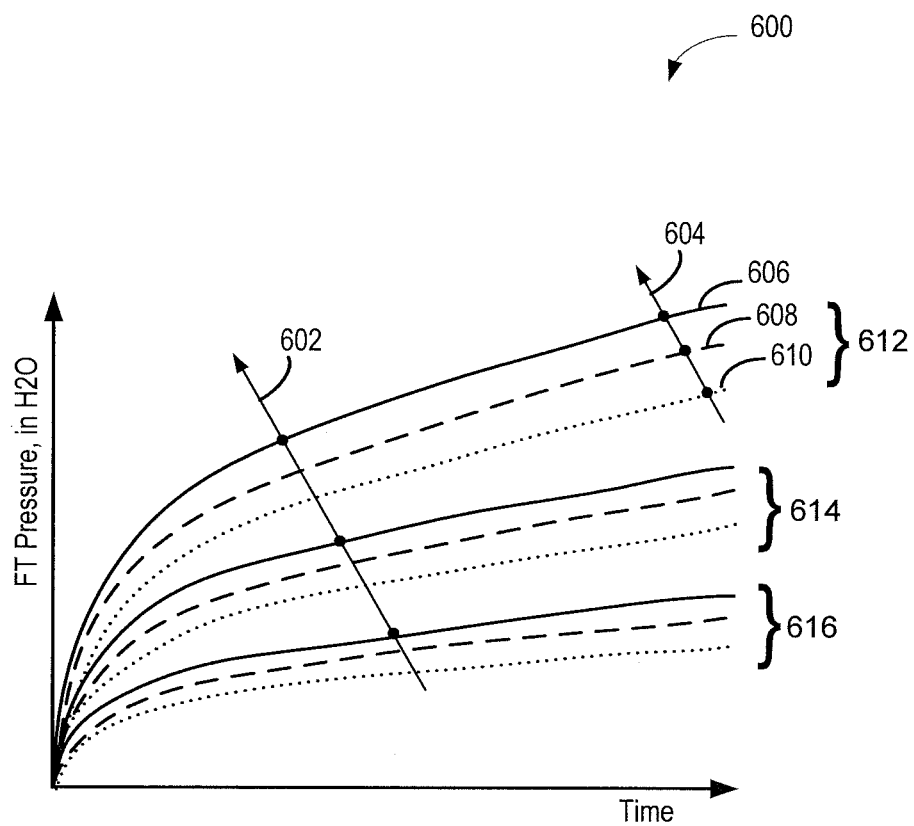
FIG. 6 shows a graph illustrating the relationship between fuel tank pressure and temperature for different RVP fuels.

Another example showing the relationship between temperature and pressure for different RVP fuels is provided at graph 600 of FIG. 6. The graph is plotted with time along the x-axis and fuel tank pressure along the y-axis. Determining peak pressures of known RVP fuels, for example, 11 RVP, 9 RVP, and 7 RVP fuels (plots 606, 608, and 610 respectively) may include sealing or isolating a fuel system by closing a canister vent valve and a canister purge valve (as described at FIG. 3), and operating a fuel pump to increase fuel vapors in the fuel tank vapor space. As shown by directional arrow 604, at a given temperature, with increasing RVP fuels (in this example, 7, 9 and 11 RVP fuels), the fuel tank pressure is higher. Directional arrow 602 indicates that with increasing temperatures (in this example, 40° F., 70° F., and 100° F.), the fuel tank pressure increases.

At a given temperature, peak pressures of different RVP fuels may vary. For example, lower RVP fuels may have lower peak pressure characteristics compared to a higher RVP fuel at a given temperature. Further, depending on the temperature, a fuel may have different peak pressure (that is, peak pressure is dependent upon temperature). Accordingly, plot sets 612, 614, and 616, plotted at 100° F., 70° F., and 40° F. respectively, have different pressure characteristics. While graph 600 shows pressure characteristics of three different RVP fuels at three different temperatures, it is not a limiting example, and similar peak pressure characterization may be expanded to more than three different RVP fuels and may be performed in increments starting from 1° F. up to 10° F. between 40° F. and 100° F.

In this way, various known RVP fuels may be characterized at different temperatures in a fuel system by isolating the fuel system and operating the fuel pump to determine peak pressure of known RVP fuels in a fuel system. The resulting peak pressure values may be stored in a look-up table as described at FIG. 7.

Turning to FIG. 7, the table 700 shows an example look-up table that contains empirical data of peak pressures of various known RVP fuels estimated at different temperatures. The look-up table may be stored in the controller. The look-up table may be utilized to estimate fuel RVP based on a peak pressure measured in the fuel tank at a given temperature. In one example, as discussed at FIG. 3, the peak pressure may be measured by isolating the fuel system and operating the pump after a refueling event followed by a vehicle-off event, and after the temperature in the fuel tank has stabilized (that is, change in temperature is less than a threshold). The determination of peak pressure is elaborated at FIG. 3.

To estimate fuel RVP, peak pressure determined at a given temperature at the fuel tank may be compared to peak pressures of fuels with known RVP at the given temperature. For example, if the temperature of the fuel tank is 70° F. and peak pressure is determined to be 1.75 In H2O after activating the fuel pump, then by comparing the measured peak pressure and temperature data to the peak pressure and temperature data of known RVP fuels in the look-up table, the fuel RVP may be estimated to be 11 RVP. While table 700 shows peak pressure and temperature data for three different RVP fuels at temperatures between 40° F. and 100° F. in increments of 10° F., look-up table may include peak pressure data for more than three different RVP fuels and may be measured at temperatures between 40° F. and 100° F. in increments starting from 1° F. up to 10° F.

In this way, a look-up table may be utilized to estimate fuel RVP by comparing measured fuel tank peak pressure at a given temperature to the look-up table containing peak pressures of various known RVP fuels at the given temperature.

Returning to FIG. 3, at 310, upon measuring the peak pressure at the given temperature of the fuel tank, the peak pressure and temperature information may be used to estimate the RVP of the fuel blend in the fuel tank by referring to a look-up table in the controller's memory that contains peak pressure data at different temperature for fuels with known RVP. The look-up table may have been previously populated with data by measuring peak pressures for various fuels with known RVP at different temperatures as elaborated at FIG. 7. By comparing the measured peak pressure and temperature to the peak pressure information in the look-up table, a fuel blend's RVP may be estimated.

At 312, the estimated fuel RVP may be compensated for altitude. For example, the estimated fuel RVP may be adjusted further based on barometric pressure (BP). This includes increasing the estimated fuel RVP as the barometric pressure decreases, or altitude increases. Upon adjusting the estimated fuel RVP based on barometric pressure, the PCM controller may be updated with the latest fuel volatility estimate.

In this way, a fuel blend's RVP may be estimated by activating fuel pump and measuring peak pressure of the fuel tank at a given temperature after a refueling event followed by a vehicle-off event and after confirming that the fuel tank temperature has stabilized and remains within a threshold. Upon estimating fuel RVP, engine operating parameters, such as fuel injection amount and threshold for leak test may be adjusted for increased fuel efficiency and more accurate leak monitoring results.

An example showing fuel tank peak pressure estimation is elaborated at FIG. 8. Specifically, an indication of whether the engine is on or off is provided at plot 802, an indication of the status (open or close) of the canister vent valve is provided at plot 804, an indication of fuel pump operation (on or off) is provided at plot 806, the characteristics of fuel tank pressure as a result of a higher RVP fuel contained in the fuel tank is provided at plot 808, and the characteristics of fuel tank pressure as a result of lower RVP fuel contained in the fuel tank is provided at plot 810. All graphs are plotted over time along the x-axis.

Prior to t1, the vehicle may be operating with the engine on. Accordingly, fuel pump may be operating to provide fuel to engine cylinder fuel injectors. The canister vent valve may be left open so that the diurnal or "running loss" vapors generated during engine operation may be adsorbed in the fuel system canister. Depending on the engine operating conditions (e.g., duration of operation, load etc.), more or less heat may be rejected to the fuel tank. As a result, the pressure in the fuel tank may change (plots 808 and 810).

At t1, a vehicle-off event is confirmed. For example, a vehicle operator may perform a key-off operation by turning the key to an off position and pulling the key out of a keyhole slot. In response to a vehicle-off event, a vehicle controller may be shifted to a sleep mode and the fuel pump may be switched off (plot 806). Due to the engine being turned off, heat rejection to the fuel tank may no longer occur. As a result temperature may gradually reduce and stabilize to ambient conditions (not shown). Consequently, a corresponding drop and stabilization in fuel tank pressure may also be observed (plots 808 and 810).

At t2, upon elapse of a longer soak duration d1, the PCM controller may be woken up (that is, shifted from the sleep mode to an awake mode). Upon waking up, between t2 and t3, the controller may monitor a change in the pressure and temperature of the fuel tank for a duration d2, which may be shorter than the duration d1. In this example, the temperature (not shown) and hence, the pressure in the fuel tank (plot 806), is stable over the duration d2 (that is, the rate of change of temperature and pressure is less than a threshold). Therefore, it may be determined that fuel volatility estimate is not likely to be degraded due to fluctuations in fuel tank temperature.

Accordingly, at t3, upon temperature and pressure in the fuel tank being stable over the duration d2, the fuel system is isolated by closing the canister vent valve (plot 804) and the fuel pump is operated (plot 806) to begin fuel volatility estimate. The operation of the pump agitates the fuel the fuel tank and causes an increase in the molar fuel content in the vapor space of the tank, which results in a corresponding increase in fuel tank pressure (plots 808 and 810).

Fuel pump may be operated for a duration between t3 and t4 until the peak pressure has reached and stabilized. The peak pressure may be the equilibrium pressure in the fuel tank (that is, when the rate of change of pressure in the fuel tank stays within a threshold during the operation of the fuel pump). At t4, in response to the peak pressure being reached and remaining stable, the fuel pump operation may be discontinued. The measured peak pressure may be utilized to estimate fuel volatility. The peak pressure at a given temperature may vary between fuels with different RVPs. An example of a higher RVP fuel is shown at plot 808, which has a higher peak pressure than a lower RVP fuel shown at plot 810 at a given temperature.

In this way, peak pressure for a fuel in a fuel system may be determined during vehicle-off conditions by allowing the temperature and pressure to stabilize over a long soak duration following the vehicle-off event, monitoring the temperature and pressure over a shorter duration, and upon stabilization of temperature and pressure, isolating the fuel system, operating a fuel pump and then, measuring the peak pressure in the fuel system. Based on measured peak pressure, fuel RVP may be estimated and accordingly, a leak test threshold may be adjusted. By performing fuel RVP estimation during conditions when temperature and pressure are stable, errors in estimation of fuel RVP due to temperature fluctuations can be reduced. By performing fuel RVP estimation during vehicle-off conditions, and not relying on engine-operation, fuel RVP estimation can be performed in even in hybrid vehicle systems.

Now turning to FIG. 4, routine 400 shows an example leak test that may be performed during either a vehicle-on or vehicle-off condition after a threshold for a leak test has been adjusted based on estimated fuel RVP. Vehicle-off conditions may include conditions as elaborated at FIG. 1. The leak test may be performed by applying positive or negative pressure to an isolated fuel system and monitoring the rate of change of pressure compared to a threshold, the threshold being adjusted based on estimated fuel RVP.

At 402, the routine includes isolating the fuel system. As described at FIG. 3, the fuel system may be isolated by closing a canister vent valve and a canister purge valve. Upon isolation of the system, at 404, a leak test is initiated by applying positive or negative pressure to the isolated fuel system. During vehicle-on conditions, leak test may include applying either positive or negative pressure to the fuel system. In one example, positive pressure may be applied to the fuel system by routing an exhaust produced by a vacuum pump of a canister of fuel system. In another example, positive pressure may be applied from a turbocharger compressor when the engine is in boosted engine operation. Further, during vehicle-on conditions, leak detection test may also include applying negative pressure from the running engine on the fuel system.

Similarly, during vehicle-off conditions, leak test may be performed by applying positive or negative pressure to the fuel system. Vehicle-off leak tests may include setting the controller to a sleep mode for a first longer duration (e.g., in hours) in response to a vehicle-off event, sealing the fuel system and monitoring the temperature and pressure for a second shorter duration (e.g., in minutes or seconds), and in response to the temperature and pressure being within a threshold range, applying positive or negative pressure to the fuel system. Applying positive pressure may include activating the fuel pump to agitate the fuel to generate vapors and thereby, increasing the fuel tank pressure. Applying negative pressure may include applying vacuum through a vacuum pump. Alternatively, negative pressure leak tests may include applying an engine-off natural vacuum following a vehicle-off event.

Next, at 406, upon application of a positive or negative pressure, it may be confirmed if the fuel tank pressure has reached a threshold. If yes, then at 408, the application of positive or negative pressure is stopped and at 410, a rate of change of fuel tank pressure is monitored. At 412, it may be determined if the rate of change of fuel tank pressure is greater than a leak test threshold. The leak test threshold may be adjusted prior to the commencement of the leak test based on fuel RVP estimation as described at FIGS. 2 and 3.

If the rate of change in fuel tank pressure is greater than the leak test threshold, a fuel system leak may be indicated. At 414, the controller may set a diagnostic code to indicate a fuel system leak. If the rate of change in fuel tank pressure is not greater than the leak test threshold, at 416, no fuel system leak may be indicated.

In this way, fuel system leaks may be monitored by applying either positive or negative pressure on the isolated fuel system and monitoring a rate of fuel tank pressure compared to a leak test threshold. By adjusting the leak test threshold for a leak test based on estimated fuel RVP, errors in fuel system leak detection may be minimized.

Figure 9:
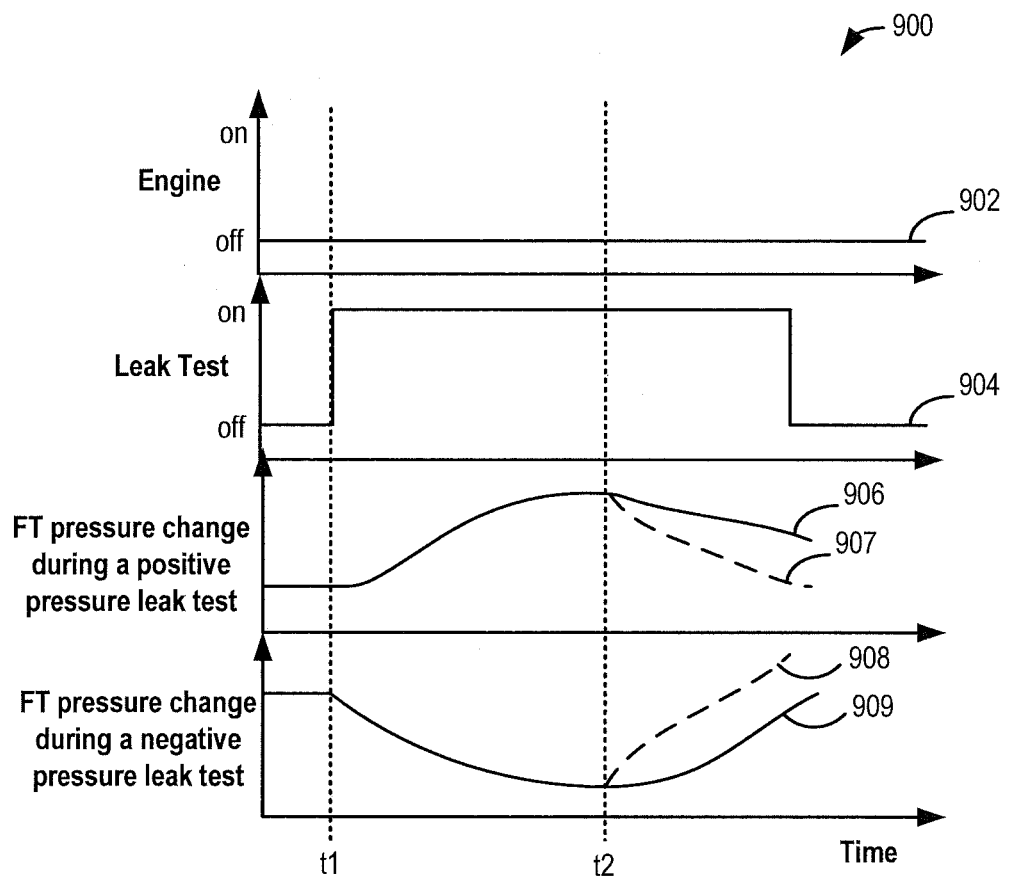
FIG. 9 shows example positive and negative pressure vehicle-off leak tests.

Example positive and negative leak tests are elaborated at FIG. 9. An example vehicle-off leak test is provided at map 900. Specifically, an indication of whether the engine is on or off is provide at plot 902, an indication of whether the leak test is running or not is provided at plot 904, changes in fuel tank pressure during a positive pressure leak test is provided at plots 906 and 907, and changes in fuel tank pressure during a negative pressure leak test is provided at plots 908 and 909. All graphs are plotted over time along the x-axis.

Before t1, the engine may be off and determination of conditions for a vehicle-off leak test may be in progress. Since the engine may be turned off, the heat from the engine may no longer be rejected to the fuel tank and the fuel tank temperature and pressure may have stabilized (plots 906 and 909). In this example, at t1, vehicle-off leak test conditions are considered met and the leak test may be performed.

During a positive pressure leak test, positive pressure may be applied to the fuel system resulting in increase in fuel tank pressure (plot 906). During a negative pressure leak test, negative pressure or vacuum may be applied to the fuel system, which may result in a decrease in fuel tank pressure (plot 909). In one example, positive pressure may be applied by operating a fuel pump to increase the molar content of the fuel vapor in the fuel tank, while negative pressure may be applied to the fuel system via a vacuum pump. Pressure may be applied to the fuel system until a threshold pressure is reached.

At t2, upon reaching a threshold pressure, the application of pressure may be stopped and a rate of change of pressure in the fuel system may be compared to a leak test threshold (plots 907 and 908). As described earlier, the leak test threshold may be adjusted based on fuel volatility estimates to enable more reliable leak detection. After t2, if the rate of change of pressure in the fuel tank is greater than a leak test threshold, it may be determined that a leak is present and a leak may be indicated. In this example, the rate of change of pressure is not greater than a leak test threshold and therefore, no leak may be indicated.

If leak test thresholds are not adjusted based on fuel volatility, false positive and false negative leak diagnostics may be obtained. For example, a highly volatile fuel could lead to a false positive leak test result in an engine-off natural vacuum leak test. Alternatively, a highly volatile fuel could overwhelm a vacuum pump during a vacuum-assisted leak test and cause a false negative read-out. Therefore, by estimating fuel volatility after each refueling event and adjusting leak detection thresholds accordingly (before a leak test), reliability of the leak diagnostics is increased and consequently, exhaust emissions can be reduced.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method, comprising:
    adjusting, at a controller, a leak test threshold for a fuel system leak test based on a volatility of a fuel, the volatility of the fuel estimated by the controller by operating a fuel pump of a fuel system during a vehicle-off condition immediately after a refueling event while a fuel tank temperature is stable;
    performing the fuel system leak test using the leak test threshold;
    indicating, via a diagnostic code set by the controller, fuel system degradation based on the fuel system leak test performed by the controller; and
    during a vehicle-on condition following the vehicle-off condition, adjusting an amount of fuel injected to an engine, via the controller, based on the estimated volatility of the fuel,
    wherein adjusting the leak test threshold includes increasing the leak test threshold as the estimated fuel volatility increases,
    wherein the fuel tank temperature is stable when a change in the fuel tank temperature for a first duration of the vehicle-off condition is within a threshold amount, and
    wherein the fuel volatility estimated by the controller during the vehicle-off condition includes, isolating, via the controller, a fuel tank of the fuel system, the fuel tank coupled to the engine, operating, via the controller, the fuel pump of the fuel system without operating the engine coupled to the fuel system for a second duration to raise fuel tank pressure, and estimating, via the controller, the fuel volatility based on a peak fuel tank pressure, wherein isolating the fuel tank of the fuel system includes closing a canister purge valve that couples a canister to an engine intake and closing a canister vent valve that couples the canister to atmosphere.

2. The method of claim 1, wherein the estimated fuel volatility is further adjusted by the controller based on barometric pressure, and where the amount of fuel injected is decreased as the estimated volatility of the fuel increases.

3. The method of claim 1, wherein the change in fuel tank temperature is monitored via a fuel tank temperature sensor coupled to the fuel tank during the vehicle-on condition following the vehicle-off condition.

4. A method for a controller coupled to an engine fuel system, comprising:
    during a first vehicle-off condition immediately following a refueling event, wherein a change of a fuel tank temperature stays within a threshold range, the change of the fuel tank temperature monitored via a temperature sensor,
    isolating a fuel tank; and
    operating a fuel pump, including agitating fuel and producing vapors, to estimate a fuel volatility,
    wherein operating the fuel pump to estimate the fuel volatility includes operating the fuel pump without operating an engine for a duration of the first vehicle-off condition to raise a fuel tank pressure above a threshold pressure, and estimating the fuel volatility based on peak pressure of the isolated fuel tank, a duration of operating the fuel pump based on one or more of a fill level of the fuel tank and the fuel tank temperature,
    wherein the engine fuel system includes a fuel vapor canister coupled between the fuel tank and the engine, and wherein isolating the fuel tank includes closing a canister vent valve coupled between the fuel vapor canister and atmosphere, and closing a canister purge valve coupled between the fuel vapor canister and an engine intake, and
    wherein the estimated fuel volatility is further adjusted based on barometric pressure, and wherein the estimated fuel volatility is based on a resulting peak pressure of the fuel tank during operation of the fuel pump while the change of the fuel tank temperature stays within the threshold range, the peak pressure of the fuel tank measured via a pressure sensor coupled to the fuel tank, where the peak pressure is an equilibrium pressure in the fuel tank during operation of the fuel pump.

5. The method of claim 4, further comprising, during a second vehicle-off condition following the first vehicle-off condition, performing a leak test to identify fuel system degradation, a threshold of the leak test based on the estimated fuel volatility, the leak test threshold increased as the estimated fuel volatility increases.

6. The method of claim 4, further comprising, during an engine-on condition following the first vehicle-off condition, adjusting a fuel injection amount based on the estimated fuel volatility, the injection amount decreased as the estimated fuel volatility increases.

7. The method of claim 4, wherein the engine fuel system is coupled in a hybrid vehicle system.

8. The method of claim 4, wherein the estimated fuel volatility includes an estimated fuel Reid Vapor Pressure (RVP).

9. A hybrid vehicle system, comprising:
    an engine including an intake;
    an electric motor;
    a fuel system including a fuel tank, a fuel vapor canister, and a fuel pump, a first valve coupling the canister to the engine intake, a second valve coupling the canister to atmosphere;

a pressure sensor coupled to the fuel tank;
a temperature sensor coupled to the fuel tank; and
a controller with computer readable instructions for:
   shifting to a sleep mode at a first vehicle-off event immediately following a tank refueling event;
   waking up from the sleep mode upon elapse of a duration since the first vehicle-off event;
   monitoring a fuel tank pressure after the waking up via the pressure sensor coupled to the fuel tank; and
   if a change of the fuel tank pressure stays within a threshold range during the monitoring,
     closing the first and second valves to seal the fuel tank;
     operating the fuel pump without operating the engine;
     estimating a fuel volatility based on a peak tank pressure; and
     adjusting a leak detection threshold based on the estimated fuel volatility.

10. The system of claim 9, wherein the controller includes further instructions for,
   during a second vehicle-off event following the first vehicle-off event, and
   in response to leak test conditions being met,
     applying pressure on the fuel system to provide a threshold fuel tank pressure;
     isolating the fuel system; and
     indicating a fuel system leak based on a rate of pressure change from the threshold fuel tank pressure being higher than the leak detection threshold.

11. The system of claim 10, wherein applying pressure on the fuel system includes applying a negative pressure on the fuel system, and wherein indicating a fuel system leak based on the rate of pressure change includes indicating a fuel system leak based on a rate of pressure bleed-up from the threshold fuel tank pressure to barometric pressure.

12. The system of claim 10, wherein leak test conditions being met includes the fuel tank pressure staying within the threshold range for a duration since the second vehicle-off event, wherein applying pressure on the fuel system includes operating the fuel pump to apply a positive pressure on the fuel system, and wherein indicating a fuel system leak based on the rate of pressure change includes indicating a fuel system leak based on a rate of pressure bleed-down from the threshold fuel tank pressure to barometric pressure.

13. The system of claim 10, wherein the controller includes further instructions for, during an engine-on condition following the first vehicle-off event, adjusting a fuel injection amount based on the estimated fuel volatility.

\* \* \* \* \*